United States Patent
Yodogawa et al.

(10) Patent No.: US 8,044,145 B2
(45) Date of Patent: Oct. 25, 2011

(54) CROSS-LINKABLE FLUOROELASTOMER, ITS COMPOSITION AND CROSS-LINKED RUBBER MOLDED PRODUCT

(75) Inventors: Masahide Yodogawa, Chiyoda-ku (JP); Masayuki Saito, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 71 days.

(21) Appl. No.: 11/740,523

(22) Filed: Apr. 26, 2007

(65) Prior Publication Data

US 2007/0276097 A1    Nov. 29, 2007

(30) Foreign Application Priority Data

May 26, 2006 (JP) ................. 2006-147443
Sep. 6, 2006 (JP) ................. 2006-241972

(51) Int. Cl.
   *C08F 14/18* (2006.01)
(52) U.S. Cl. ............... 525/326.2; 525/326.3; 525/333.8; 525/387; 252/186.42; 526/227
(58) Field of Classification Search ............... 525/326.2, 525/326.3, 387
See application file for complete search history.

(56) References Cited

U.S. PATENT DOCUMENTS

| | | | |
|---|---|---|---|
| 3,825,510 A | | 7/1974 | Yamamoto et al. |
| 4,148,982 A | * | 4/1979 | Morozumi et al. ............ 525/388 |
| 4,151,342 A | * | 4/1979 | Uchino et al. ................ 526/273 |
| 4,530,970 A | * | 7/1985 | Morozumi et al. ............ 525/193 |
| 4,645,799 A | | 2/1987 | Wachi et al. |
| 4,785,045 A | * | 11/1988 | Yonekura et al. ............. 524/528 |
| 5,206,293 A | * | 4/1993 | Sakai et al. ................... 525/194 |
| 6,380,337 B2 | * | 4/2002 | Abe et al. ...................... 526/255 |
| 2002/0119319 A1 | * | 8/2002 | Funaki et al. ................. 428/421 |
| 2004/0092670 A1 | * | 5/2004 | Schmiegel et al. ......... 525/326.2 |
| 2005/0075461 A1 | * | 4/2005 | Morimoto et al. ......... 525/326.3 |

FOREIGN PATENT DOCUMENTS

| | | |
|---|---|---|
| EP | 0 317 346 A1 | 5/1989 |
| EP | 0 905 177 A1 | 3/1999 |
| EP | 0 957 148 A1 | 11/1999 |
| EP | 1 236 746 A1 | 9/2002 |
| JP | 53-9848 | 1/1978 |

OTHER PUBLICATIONS

Worm et al., Fluorocarbon Elastomers, Encyclopedia of Polymer Science and Technology, Oct. 2001.*
Hill et al., Radiation Chemistry of Polymers, Encyclopedia of Polymer Science and Technology, Oct. 2004.*
Peterson, Macromolecular Chemistry and Physics, 2001, 202, No. 6, pp. 775-784.*
Saule, Macromolecules, 2005, 38 (1), pp. 77-85.*
U.S. Appl. No. 12/754,650, filed Apr. 6, 2010, Yodogawa, et al.
U.S. Appl. No. 12/911,996, filed Oct. 26, 2010, Yodogawa, et al.

* cited by examiner

*Primary Examiner* — Vasu Jagannathan
*Assistant Examiner* — Robert C Boyle
(74) *Attorney, Agent, or Firm* — Oblon, Spivak, McClelland, Maier & Neustadt, L.L.P.

(57) ABSTRACT

To provide a cross-linkable fluoroelastomer, a cross-linkable fluoroelastomer composition and a cross-linked rubber molded products thereof.
A cross-linkable fluoroelastomer having a Mooney viscosity of from 20 to 300, obtainable by heat treating a mixture of a fluoroelastomer (A) and an organic peroxide (B) at a temperature of from 110 to 380° C. for from 10 seconds to 3 hours; a fluoroelastomer composition comprising the cross-linkable fluoroelastomer, a cross-linking agent (C) and a cross-linking assistant (D); and cross-linked rubber molded products thereof.

42 Claims, 2 Drawing Sheets

CROSS-LINKABLE FLUOROELASTOMER, ITS COMPOSITION AND CROSS-LINKED RUBBER MOLDED PRODUCT

The present invention relates to a fluoroelastomer capable of exhibiting an excellent cross-linking reactivity and a high cross-linking rate, a fluoroelastomer composition containing it, and a cross-linked rubber molded product excellent in the cross-linked physical properties.

A tetrafluoroethylene/propylene copolymer (hereinafter referred to also as a TFE/P copolymer) is used as a rubber material excellent in the heat resistance and chemical resistance in such a severe environment that ordinary rubber materials are not durable. However, the TFE/P copolymer is poor in the cross-linking reactivity at the time of producing a rubber product. As a method for improvement, a method of carrying out heat treatment at a high temperature for a long time was proposed (e.g. Patent Document 1). However, by such a method, the production efficiency was inadequate, since it required heat treatment at a high temperature over a long time.

Further, a fluoroelastomer composition obtained by incorporating various blend materials to the heat-treated TFE/P copolymer obtained by this method, was excellent in a cross-linking reactivity when it was molded and cross-linked by means of a mold, but its mold release characteristics were not necessarily adequate.

Accordingly, it has been desired to develop a production method excellent in the productivity, whereby cross-linkable functional groups can be introduced into the fluoroelastomer, and a cross-linkable fluoroelastomer excellent in the mold release characteristics, can be obtained.

Patent Document 1: JP-A-53-9848

It is an object of the present invention to provide a cross-linkable fluoroelastomer excellent in the cross-linking reactivity and excellent in the mold release characteristics, a cross-linkable fluoroelastomer composition, and a cross-linked rubber molded product thereof excellent in the cross-linked rubber physical properties.

The present inventors have found that when an organic peroxide is mixed to a fluoroelastomer poor in the cross-linking reactivity, followed by heat treatment, its cross-linking reactivity can be remarkably improved. Further, it has been found that a fluoroelastomer composition obtained by using the obtained fluoroelastomer, is excellent in the mold release characteristics when it is molded and cross-linked by means of a mold. Further, it has been found that when the fluoroelastomer composition obtained by using the obtained fluoroelastomer is cross-linked, a cross-linked rubber molded product excellent in the cross-linked rubber physical properties can be obtained. Thus, the present invention has been accomplished.

Namely, the present invention provides a cross-linkable fluoroelastomer having a Mooney viscosity of from 20 to 300, obtainable by heat-treating a mixture of a fluoroelastomer (A) and an organic peroxide (B) at a temperature of from 110 to 380° C. for from 10 seconds to 3 hours.

Further, the present invention provides the above cross-linkable fluoroelastomer, of which the infrared absorption spectrum has an absorption peak at from 1,640 to 1,700 cm$^{-1}$.

Further, the present invention provides the above cross-linkable fluoroelastomer, wherein the intensity of the absorption peak at from 1,640 to 1,700 cm$^{-1}$ of the infrared absorption spectrum as represented by absorbance is from 0.01 to 5.0.

Further, the present invention provides the above cross-linkable fluoroelastomer, of which the infrared absorption spectrum as represented by absorbance has no absorption peak at from 1,740 to 1,800 cm$^{-1}$ or has an absorption peak at from 1,740 to 1,800 cm$^{-1}$ with an absorption peak intensity of at most 2.0.

Further, the present invention provides the above cross-linkable fluoroelastomer, wherein the blend ratio of the organic peroxide (B) is from 0.1 to 10 parts by mass per 100 parts by mass of the fluoroelastomer (A).

Further, the present invention provides the above cross-linkable fluoroelastomer, wherein the fluoroelastomer (A) is a tetrafluoroethylene/propylene copolymer.

Further, the present invention provides the above cross-linkable fluoroelastomer, wherein the temperature for half life of one minute of the organic peroxide (B) is from 110 to 300° C.

Further, the present invention provides a method for producing a cross-linkable fluoroelastomer, which comprises heat-treating a fluoroelastomer (A) and an organic peroxide (B) at a temperature of from 110 to 380° C. for from 10 seconds to 3 hours.

Further, the present invention provides the above method, wherein the fluoroelastomer (A) and the organic peroxide (B) are kneaded by means of an extruder.

Further, the present invention provides a fluoroelastomer composition comprising the above cross-linkable fluoroelastomer, a cross-linking agent (C) and a cross-linking assistant (D).

Further, the present invention provides a cross-linked rubber molded product obtained by cross-linking the above fluoroelastomer composition.

Further, the present invention provides a cross-linked rubber molded product obtained by cross-linking the above cross-linkable fluoroelastomer by applying an ionizing radiation thereto.

The cross-linkable fluoroelastomer of the present invention is excellent in rubber elasticity and cross-linking reactivity, and the cross-linked rubber molded product is excellent in cross-linked rubber physical properties and excellent in heat resistance, chemical resistance, weather resistance, mold release characteristics, etc.

Further, the cross-linkable fluoroelastomer of the present invention is far superior in the productivity as compared with the prior art, and the cross-linkable fluoroelastomer composition is excellent also in mold release characteristics.

Figure 1:
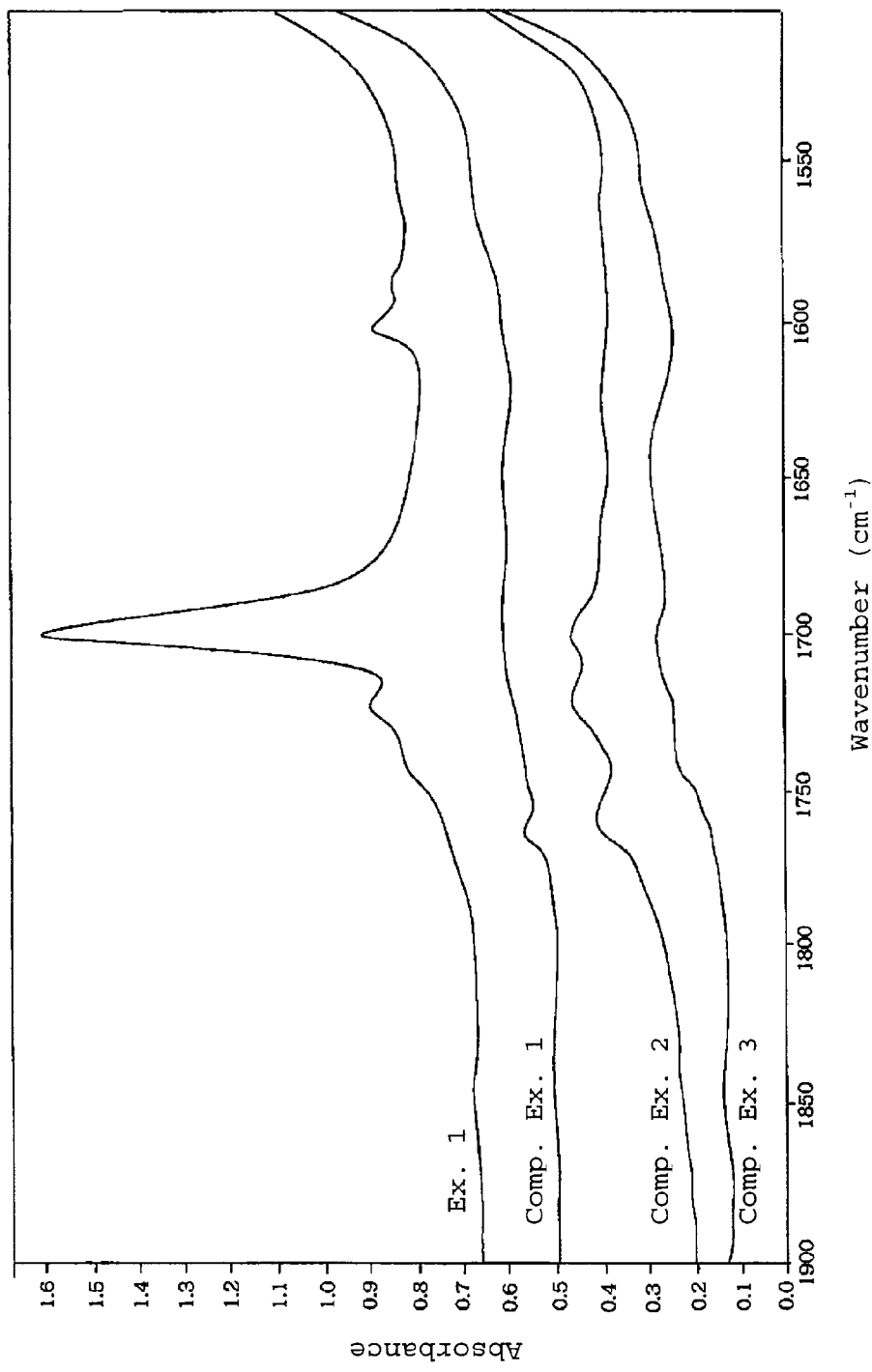
FIG. 1 is a chart showing infrared absorption spectra of one embodiment of the cross-linked fluoroelastomer of the present invention and fluoroelastomers of the prior art.
Figure 2:
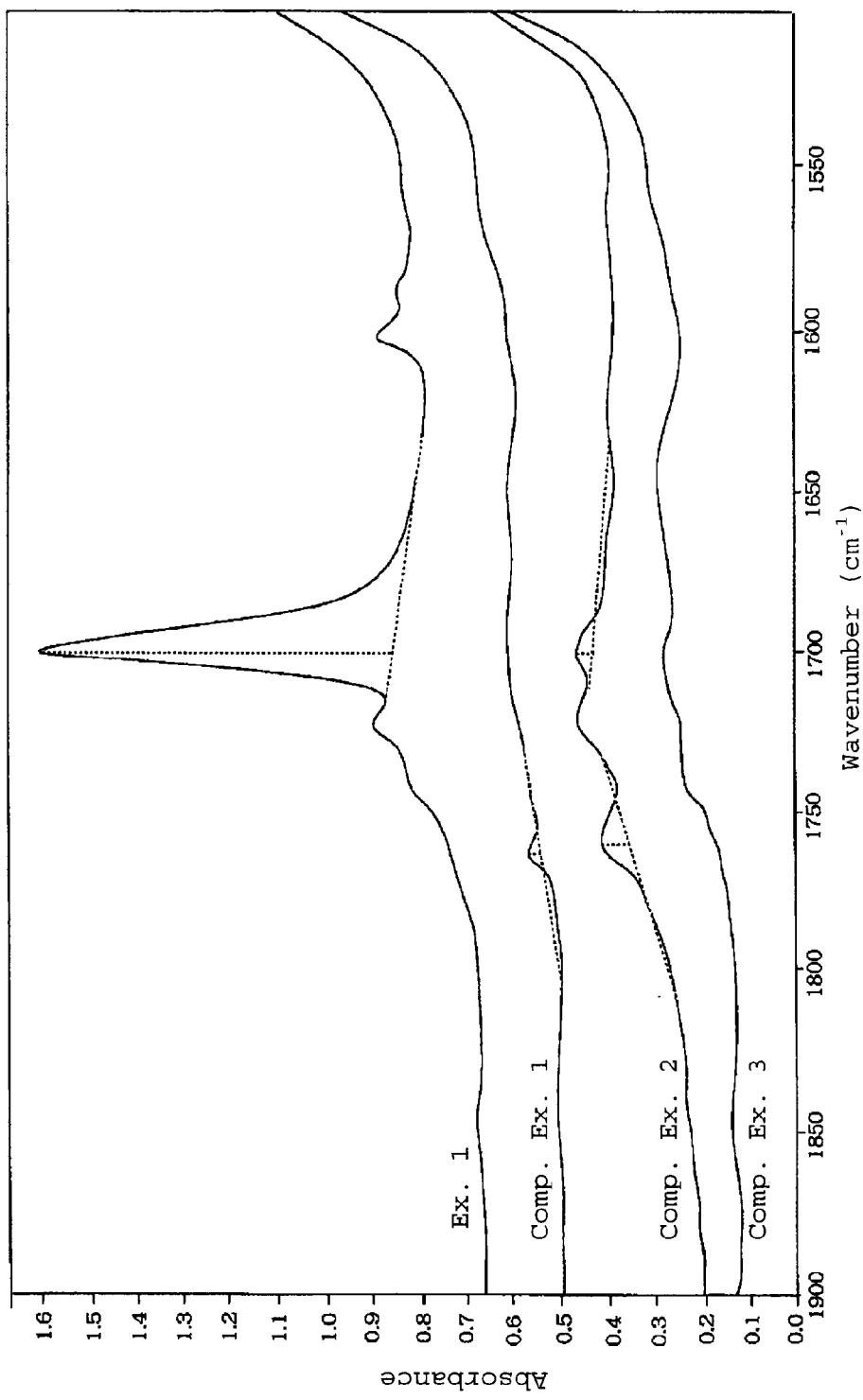
FIG. 2 is a view showing the method for obtaining the intensity of each absorption peak top in the infrared absorption spectra in FIG. 1.

As the fluoroelastomer (A) to be used in the present invention, a known fluoroelastomer may be employed. Particularly, a fluoroelastomer having no cross-linkable functional groups may suitably be employed.

In the present invention, the cross-linkable functional group may, for example, be a carbon-carbon unsaturated bond, iodine, bromine, a cyano group or a hydrolysable silyl group. Specific examples of the fluoroelastomer (A) include a tetrafluoroethylene/propylene copolymer, a tetrafluoroethylene/propylene/vinylidene fluoride copolymer, a vinylidene fluoride/hexafluoropropylene copolymer, and a vinylidene fluoride/hexafluoropropylene/tetrafluoroethylene copolymer. Among them, a tetrafluoroethylene/propylene copolymer poor in the cross-linking reactivity is preferred.

The tetrafluoroethylene/propylene copolymer may be one obtained by copolymerization of tetrafluoroethylene (hereinafter referred to as TFE) and propylene (hereinafter referred to as P) only, or may be one obtained by copolymerization of TFE and P with other monomers. Such other monomers may, for example, be hexafluoropropylene, vinylidene fluoride, a perfluorovinyl ether of the formula $CF_2=CF-O-R^f$ (wherein $R^f$ is a $C_{1-8}$ saturated perfluoroalkyl group or a perfluoro(alkoxyalkyl) group), an α-olefin such as ethylene or butene (excluding propylene) and a vinyl ether such as methyl vinyl ether or ethyl vinyl ether. Such other monomers may be used alone or in combination as a mixture of two or more of them.

The composition of the TFE/P copolymer preferably has a ratio of repeating units based on TFE/repeating units based on P=40/60 to 60/40 (molar ratio). Within such a compositional range, the obtainable cross-linked rubber will be excellent in the cross-linked rubber physical properties, and the heat resistance and chemical resistance will be good. The content of repeating units based on other monomers is preferably from 0 to 30 mol %, more preferably from 0 to 15 mol %.

As a method for producing the fluoroelastomer (A) to be used in the present invention, any conventional method may be used. For example, emulsion polymerization, solution polymerization, suspension polymerization or bulk polymerization may, for example, be mentioned. Further, for the initial reaction, a radical polymerization initiator, a redox polymerization initiator, heat, radiation, etc., may be employed. Emulsion polymerization is preferred, whereby adjustment of the molecular weight and the copolymer composition is easy, and it is excellent in productivity.

The cross-linkable fluoroelastomer of the present invention is obtainable by heat-treating a mixture of the above fluoroelastomer (A) and an organic peroxide (B). By the heat treatment, its cross-linking reactivity will be remarkably improved.

Such an organic peroxide (B) is preferably an organic peroxide having a temperature of half life of one minute (a temperature at which its half life is one minute) being from 110 to 300° C., more preferably from 110 to 250° C., most preferably from 110 to 200° C.

Specific examples thereof include dicumyl peroxide, 1,3-bis(tert-butylperoxyisopropyl)benzene, tert-butylcumyl peroxide, cumene hydroperoxide, diisopropylbenzene hydroperoxide, tert-butylperoxybenzoate, 2,5-dimethyl-2,5-dibenzoyl peroxyhexane, di-tert-butyl peroxide, 2,5-dimethyl-2,5-di-tert-butyl peroxyhexane and dibenzoyl peroxide. Preferred is dicumyl peroxide, 1,3-bis(tert-butylperoxyisopropyl)benzene, tert-butylcumyl peroxide, tert-butylperoxybenzoate, 2,5-dimethyl-2,5-dibenzoyl peroxyhexane or di-tert-butyl peroxide. More preferred is dicumyl peroxide, 1,3-bis(tert-butylperoxyisopropyl)benzene, tert-butylcumyl peroxide, tert-butylperoxybenzoate or 2,5-dimethyl-2,5-dibenzoyl peroxyhexane. Such organic peroxides (B) may be used alone or in combination as a mixture of two or more of them.

The blend amount of the organic peroxide (B) is preferably from 0.1 to 10 parts by mass, more preferably from 0.5 to 7 parts by mass, per 100 parts by mass of the fluoroelastomer (A). Within such a range, cross-linkable functional groups will be introduced into the fluoroelastomer (A), and a cross-linkable fluoroelastomer excellent in cross-linkability can be obtained.

The heat-treating temperature is preferably from 110 to 380° C. Such a temperature range agrees to the temperature for half life of one minute of the organic peroxide to be incorporated, whereby the reaction for introduction of cross-linkable functional groups by the organic peroxide will be facilitated. More preferably, it is from 150 to 320° C., most preferably from 150 to 300° C. Within such a range, there will be little heat decomposition of the polymer and a cross-linkable fluoroelastomer excellent in cross-linking reactivity can be obtained.

The heat-treating time is preferably from 10 seconds to 3 hours. By such a heat-treating time, a cross-linkable fluoroelastomer excellent in cross-linking reactivity can be obtained.

The Mooney viscosity of the cross-linkable fluoroelastomer of the present invention is from 20 to 300, preferably from 20 to 270, more preferably from 30 240, most preferably from 30 to 200. The Mooney viscosity is an index for the molecular weight. Namely, the larger the Mooney viscosity, the higher the molecular weight, and the smaller the Mooney viscosity, the lower the molecular weight. Within such a range, the processability of the fluoroelastomer, and the cross-linked rubber physical properties will be good. Such a Mooney viscosity is a value to be measured in accordance with JIS K6300 using a large rotor having a diameter of 38.1 mm and a thickness of 5.54 mm at 100° C. by setting the preheating time to be one minute and a rotor rotational time to be 4 minutes.

The cross-linkable fluoroelastomer of the present invention has an absorption peak at from 1,640 to 1,700 $cm^{-1}$ in its infrared absorption spectrum. More preferably, it has an absorption peak at from 1,660 to 1,700 $cm^{-1}$ in the infrared absorption spectrum. More preferably, it has an absorption spectrum at from 1,680 to 1,700 $cm^{-1}$. The absorption peak within such a range is attributable to a carbon-carbon unsaturated bond. Such an absorption peak is not observed with a fluoroelastomer (A) before the heat treatment, and accordingly, it is considered that during the heat treatment of the mixture with the organic peroxide, an unsaturated bond has been introduced by such a mechanism that a hydrogen atom of the fluoroelastomer (A) is withdrawn. The cross-linkable fluoroelastomer having an absorption peak within this range, is excellent in the cross-linkability. Further, the peak intensity of the infrared absorption spectrum as represented by absorbance is preferably from 0.01 to 5.0, more preferably from 0.02 to 2.0, further preferably from 0.03 to 1.8, most preferably from 0.05 to 1.5. The cross-linkable fluoroelastomer having the absorption peak intensity within this range, is excellent in the cross-linkability.

Further, the cross-linkable fluoroelastomer of the present invention preferably has no absorption peak or a small absorption peak at from 1,740 to 1,800 $cm^{-1}$ in its infrared absorption spectrum. The peak intensity of the absorption peak at from 1,740 to 1,800 $cm^{-1}$ in the infrared absorption spectrum represented by absorbance is preferably at most 2.0, more preferably at most 0.2, further preferably at most 0.02, still further preferably at most 0.002, most preferably no peak being observed. An absorption peak within this range is considered to be attributable to a functional group such as a hydroxycarbonyl group formed by modification of e.g. a polymer terminal. If the cross-linkable fluoroelastomer has an absorption peak having high intensity within this range, such an elastomer tends to be poor in the mold release properties.

In the present invention, the heat treatment is carried out preferably by using a heating oven, an extruder, a kneader or the like.

As a method for producing a cross-linkable fluoroelastomer of the present invention, preferred is a method for producing a cross-linkable fluoroelastomer wherein the fluoroelastomer (A) and the organic peroxide (B) are kneaded by means of an extruder at a temperature of 110 to 380° C. for from 10 seconds to 3 hours.

The kneading time when an extruder is employed, is more preferably from 10 seconds to 30 minutes, most preferably from 10 seconds to 15 minutes. Further, a method for producing a cross-linkable fluoroelastomer may be mentioned wherein a mixture of particles of the fluoroelastomer (A) and particles or liquid of the organic peroxide (B), is molded and heat-treated at a temperature of from 110 to 380° C. for from 10 seconds to 3 hours. It is preferred to use a two-roll mill or a kneader for the mixing or kneading of the particles of the fluoroelastomer (A) and the particles or liquid of the organic peroxide (B).

The fluoroelastomer composition comprising the cross-linkable fluoroelastomer of the present invention, a cross-linking agent (C) and a cross-linking assistant (D) is excellent in cross-linkability and also excellent in mold-release properties.

As the cross-linking agent (C), an organic peroxide is preferred, and those known as cross-linking agents for rubber may all be used. For example, dicumyl peroxide, 1,3-bis(tert-butylperoxyisopropyl)benzene, tert-butylcumyl peroxide, cumene hydroperoxide, diisopropylbenzene hydroperoxide, tert-butylperoxybenzoate, 2,5-dimethyl-2,5-dibenzoyl peroxyhexane, di-tert-butyl peroxide, 2,5-dimethyl-2,5-di-tert-butyl peroxyhexane or dibenzoyl peroxide may be mentioned. Preferred is dicumyl peroxide, 1,3-bis(tert-butylperoxyisopropyl)benzene, tert-butylcumyl peroxide, tert-butylperoxybenzoate, 2,5-dimethyl-2,5-dibenzoyl peroxyhexane or di-tert-butyl peroxide. More preferred may, for example, be dicumyl peroxide, 1,3-bis(tert-butylperoxyisopropyl)benzene, tert-butylcumyl peroxide, tert-butylperoxybenzoate or 2,5-dimethyl-2,5-dibenzoyl peroxyhexane.

Cross-linking agents of component (C) may be used alone or in combination as a mixture of two or more of them.

The content of the cross-linking agent is preferably from 0.3 to 10 parts by mass, more preferably from 0.3 to 5 parts by mass, most preferably from 0.5 to 3 parts by mass, per 100 parts by mass of the cross-linkable fluoroelastomer. Within such a range, it is possible to obtain a cross-linked rubber excellent in the balance of tensile strength and elongation.

As the cross-linking assistant (D), an unsaturated polyfunctional compound is preferred. By an unsaturated polyfunctional compound, the cross-linking efficiency can be made high. As such an unsaturated polyfunctional compound, conventional ones may all be used. Specific examples include triallyl cyanurate, triallyl isocyanurate, triallyl isocyanurate oligomer, trimethallyl isocyanurate, 1,3,5-triacryloylhexahydro-1,3,5-triazine, triallyl trimellitate, m-phenylenediamine bismaleimide, p-quinonedioxime, p,p'-dibenzoyl quinonedioxime, di-propargyl terephthalate, diallyl phthalate, N,N',N'',N'''-tetraallyl terephthalamide, and a vinyl group-containing siloxane oligomer such as polymethylvinyl siloxane or polymethylphenylvinyl siloxane.

Among them, triallyl cyanurate, triallyl isocyanurate or trimethallyl isocyanurate is particularly preferred, and triallyl isocyanurate is more preferred.

Such cross-linking assistants of component (D) may be used alone or in combination as a mixture of two or more of them.

The content of the cross-linking assistant of component (D) is preferably from 0.1 to 10 parts by mass, more preferably from 0.5 to 7 parts by mass, per 100 parts by mass of the fluoroelastomer. Within such a range, it is possible to obtain cross-linked rubber physical properties having a good balance of the strength and elongation. To the fluoroelastomer composition of the present invention, a reinforcing material, a filler, an additive, etc., may suitably be incorporated. As the reinforcing material and filler, a reinforcing material and filler for rubber which have been commonly used for the production of cross-linked rubber may, for example, be mentioned. For example, carbon black such as channel black, furnace black, acetylene black or thermal black, an inorganic reinforcing material such as white carbon, magnesium carbonate, surface-treated calcium carbonate, an inorganic filler such as calcium carbonate, clay, talc, silica, diatomaceous earth, alumina or barium sulfate, or other fillers, may be mentioned. As the additive, an additive such as a pigment, an antioxidant, a stabilizer, a processing aid or an internal mold release agent, may, for example, be mentioned.

Such reinforcing materials, fillers and additives may, respectively, be used alone or in combination as a mixture of two or more of them. The blend amount of the reinforcing material may suitably be selected, but it is preferably from 1 to 100 parts by mass per 100 parts by mass of the fluoroelastomer. The blend amount of the filler may suitably be selected, but it is preferably from 1 to 100 parts by mass per 100 parts by mass of the fluoroelastomer.

Further, to the fluoroelastomer composition of the present invention, at least one of rubbers such as other fluororubbers, EPDM, silicone rubber and acyl rubber, and resins such as fluororesins, may be incorporated.

For the production of a fluoroelastomer composition of the present invention, it is desirable to uniformly mix the cross-linkable fluoroelastomer, the unsaturated polyfunctional compound, the organic peroxide, and, if necessary, an oxide and/or hydroxide of a bivalent metal, a fluororubber, other reinforcing material, filler, processing aid, additive, etc. Such mixing can be carried out by means of a roll mill for kneading rubber, a kneader or a Banbury mixer which has been commonly used. The working conditions for the mixing are not particularly limited, but usually, the added blend components can adequately be dispersed and mixed in the fluoroelastomer by kneading at a temperature of from about 30 to 80° C. for from about 10 to 60 minutes. Further, such added blend components may be dissolved and dispersed in a suitable solvent to form a suspension solution. Otherwise, the mixing may be carried out by so-called wet mixing, which is carried out in a solvent from the beginning. In such a case, a blend composition in a solution state may be obtained by using a mixing machine such as a roll mill, a ball mill or a homogenizer. Here, for the working conditions or operation of the mixing, the optimal conditions should better be selected depending upon the purpose or types of the starting materials to be used and the blend product.

The fluoroelastomer composition of the present invention may be formed into molded products such as seals, packings, sheets, pipes, rods, tubes, angles, channels, coated fabrics, coated plates or wire coatings by usual molding or other molding methods such as extrusion, transfer, calendering, roll coating, brush coating or impregnation. Otherwise, it may be formed also into profiles or special molding products such as sponge rubbers by various molding methods.

The composition of the present invention is cured by heating.

A conventional operation may be employed as the operation for such curing. As curing by heating, an operation of heating under pressure in a mold may, for example, be employed, or an operation of heating in a heating furnace or a steam oven after the composition is formed by extrusion or calender rolling may be employed. With respect to the operation conditions for the curing, the optimal conditions may be selected for use depending upon the materials to be used or the blend.

The temperature for cross-linking by heating is usually at a level of from 60 to 250° C., preferably from 120 to 200° C. Further, the heating time is not particularly limited, but it is usually within a range of from one minute to three hours, preferably within a range of from 5 minutes to two hours, depending upon the type of the organic peroxide. If the heating temperature is increased, the heating time may be shortened. Further, re-heating treatment of the obtainable cross-linked product may also be employed, and such may be useful for improvement of the physical properties. For example, re-heating treatment at a temperature of from 150 to 250° C., preferably from 180 to 230° C., for from about 2 to 25 hours, may be employed.

The cross-linkable fluoroelastomer of the present invention may be cross-linked by irradiation with an ionizing radiation without incorporating component (C) or component (D). Otherwise, after mixing components (C) and (D), it may be cross-linked by irradiation with the radiation. As the ionizing radiation, electron rays or γ-rays may, for example, be mentioned. As a preferred embodiment for cross-linking by application of a radiation, there may be mentioned a case where a suspension solution having the fluoroelastomer composition of the present invention dissolved and dispersed in a suitable solvent, is applied by e.g. coating and dried, and then irradiated with a radiation, or a case wherein the fluoroelastomer composition of the present invention is formed by extrusion, followed by irradiation with a radiation. The exposure dose by irradiation with electron rays may suitably be selected, but it is usually preferably from 1 to 300 kGy, more preferably from 10 to 200 kGy.

Now, the present invention will be described in further detail with reference to Examples. However, it should be understood that the present invention is by no means restricted to such specific Examples. In the Examples, "parts" means "parts by mass".

In the respective Examples and Comparative Examples, the following operations were carried out.

Infrared Absorption Intensity

Measurements of the composition and the intensity of an absorption peak in infrared (IR) were carried out as follows. One gram of the fluoroelastomer was sampled and pressed to a thickness of about 0.2 mm by hot pressing at 170° C., and using this pressed product, measurement of the transmission infrared absorbance was carried out by FT-IR (PROTEGE 460, manufactured, by Nicolet).

For the intensity of the absorption peak at from 1,640 to 1,700 $cm^{-1}$, the intensity of the absorption peak top present at from 1,640 to 1,700 $cm^{-1}$ is obtained, as represented by absorbance, from the height perpendicular from a line connecting the intensities at two points of 1,630 $cm^{-1}$ and 1,710 $cm^{-1}$, and represented by the absorbance calculated as corresponding to a thickness of 0.2 mm.

For the intensity of the absorption peak at from 1,740 to 1,800 $cm^{-1}$, in a case where an absorption peak is observed at from 1,740 to 1,800 $cm^{-1}$, as represented by absorbance, the strength of the absorption peak top is obtained from the height perpendicular from a line connecting the intensities at two points of 1,730 $cm^{-1}$ and 1,810 $cm^{-1}$, and represented by an absorbance calculated as corresponding to a thickness of 0.2 mm.

Mooney Viscosity

In accordance with JIS K6300, using a large rotor having a diameter of 38.1 mm and a thickness of 5.54 mm, measurements were carried out at 100° C. by setting the preheating time to be one minute and the rotor rotational time to be 4 minutes.

Mold Release Properties

For the measurement of the mold release force, using a flat plate die of 50×130×1 mm finely polished and degreased, the fluoroelastomer composition was subjected to press cross-linking at 170° C. for 10 minutes without using a release agent, and immediately after the completion, a sample with a width of 50 mm was pinched by a clip, and the force for releasing it perpendicularly from the die in a longitudinal direction of 130 mm, was measured by a pull gauge. The measurement was repeated 25 times, and the average value was taken. The unit was g/50 mm. Further, as convenient evaluation standards for mold-release properties, a case where the sample had a firmly bonded portion and was torn during the release, was identified by "X" (no good), and a case where releasing was done under a constant force without being torn, was identified by "○" (good)

Cross-Linkability

A fluoroelastomer composition was subjected to measurement of the cross-linking properties by means of a cross-linking property measuring apparatus (RPA, manufactured by Alpha Technologies) at 177° C. for 12 minutes under a condition of an amplitude of 3 degrees. MH represents the maximum value of the torque, ML represents the minimum value of the torque, and MH-ML represents the cross-linking density (also called the vulcanization density).

EXAMPLE 1

To 100 parts of a TFE/P copolymer (copolymer composition: TFE/P=56/44 (mol %), Mooney viscosity: 105), 1 part of dicumyl peroxide (Percumyl D, manufactured by NOF CORPORATION, temperature for half life of one minute: 175.2° C.) was added, followed by mixing by a two roll mill, and the mixture was put into a single screw extruder set at 300° C. and extruded for a retention time of two minutes to obtain a cross-linkable fluoroelastomer. The infrared absorption spectrum of the obtained cross-linkable fluoroelastomer is shown in FIG. 1.

EXAMPLES 2 AND 3

Treatment was carried out under the conditions as shown in Table 1 in the same manner as in Example 1 except that only the organic peroxide used was changed, whereby a cross-linkable fluoroelastomer was obtained. In Example 2, tert-butylcumyl peroxide (Perbutyl C, manufactured by NOF CORPORATION, temperature for half life of one minute: 173.3° C.) was used. In Example 3, 1,3-bis(tert-butyl peroxyisopropyl)benzene (Perbutyl P, manufactured by NOF CORPORATION, temperature for half life of one minute: 175.4° C.) was used.

EXAMPLES 4 AND 5

Treatment was carried out under the conditions as shown in Table 1 in the same manner as in Example 1 except that the organic peroxide used and the heat-treating conditions were changed, whereby a cross-linkable fluoroelastomer was obtained. In Example 5, di-tert-butyl peroxide (Perbutyl D, manufactured by NOF CORPORATION, temperature for half life of 1 minute: 185.9° C.) was used.

COMPARATIVE EXAMPLE 1

The TFE/P copolymer as used in Example 1 was put into a single screw extruder set at 300° C. and extruded for a retention time of two minutes. The infrared absorption spectrum of the obtained TFE/P copolymer is shown in FIG. 1.

COMPARATIVE EXAMPLE 2

The TFE/P copolymer as used in Example 1 was subjected to heat treatment for 15 hours by using an oven of 300° C. The infrared absorption spectrum of the obtained TFE/P copolymer is shown in FIG. 1.

COMPARATIVE EXAMPLE 3

The infrared absorption spectrum of the TFE/P copolymer used in Example 1 is shown in FIG. 1.

EXAMPLES 6 TO 10

Using the cross-linkable fluoroelastomers produced in the above Examples 1 to 5, various blend materials were uniformly mixed by means of a two roll mill in accordance with the components and blend amounts as shown in Table 2, to prepare fluoroelastomer compositions. The cross-linkability of these fluoroelastomer compositions was measured. Further, these fluoroelastomer compositions were cross-linked by pressing at 170° C. for 20 minutes and then secondarily cross-linked under conditions of 200° C. for 4 hours in an oven.

COMPARATIVE EXAMPLE 4

Using the fluoroelastomer obtained in the above Comparative Example 1, a blend material was uniformly mixed by means of a two roll mill in accordance with the components and blend amounts as shown in Table 2, whereby a fluoroelastomer composition was prepared. This fluoroelastomer composition was cross-linked under the same conditions as in Examples 4 to 6, but it was not cross-linked, and no cross-linked product was formed.

COMPARATIVE EXAMPLE 5

Using the fluoroelastomer obtained in the above Comparative Example 2, a blend material was uniformly mixed by means of a two roll mill in accordance with the components and blend amounts as shown in Table 2, whereby a fluoroelastomer composition was prepared. This fluoroelastomer composition was cross-linked under the same conditions as in Examples 4 to 6. The cross-linked product adhered to a mold, and the mold-release properties were poor.

COMPARATIVE EXAMPLE 6

Using the fluoroelastomer in the above Comparative Example 3, a blend material was uniformly mixed by means of a two roll mill in accordance with the components and blend amounts as shown in Table 2, whereby a fluoroelastomer composition was prepared. This fluoroelastomer composition was cross-linked under the same conditions as in Example 4 to 6, but it was not cross-linked, and no cross-linked product was formed.

EXAMPLE 11

Using the above Example 1, an extruded tube is prepared and cross-linked by irradiation with γ-rays of 20 kGy, whereby a good cross-linked tubular product can be obtained.

EXAMPLE 12

50 parts of the cross-linkable fluoroelastomer produced in the above Example 1, 50 parts of ethylene/TFE copolymer (Fluon ETFE C-88AX, manufactured by Asahi Glass Company, Limited) and 5 parts of triallyl isocyanurate (TAIC, manufactured by Nihon Kasei Company, Limited) are mixed by a twin extruder to give a compound. Using the obtained compound, a molded cable is prepared and cross-linked by irradiation with γ-rays of 100 kGy, whereby a good cross-linked cable product can be obtained.

TABLE 1

| | | Examples | | | | | Comparative Examples | | |
|---|---|---|---|---|---|---|---|---|---|
| | | 1 | 2 | 3 | 4 | 5 | 1 | 2 | 3 |
| TFE/P copolymer | | 100 | 100 | 100 | 100 | 100 | 100 | 100 | 100 |
| Organic peroxide | Percumyl D | 1 | — | — | — | — | — | — | — |
| | Perbutyl C | — | 1 | — | — | — | — | — | — |
| | Perbutyl P | — | — | 1 | 1 | 1 | — | — | — |
| | Perbutyl D | — | — | — | — | 2 | — | — | — |
| Heat treatment temperature | | 300° C. | 300° C. | 300° C. | 250° C. | 250° C. | 300° C. | 300° C. | — |
| Heat treatment time | | 2 min | 2 min | 2 min | 2 min | 2 min | 2 min | 15 hours | — |
| Mooney viscosity | | 135 | 122 | 130 | 133 | 143 | 100 | 95 | 105 |
| IR peak position | 1,640 to 1,700 cm$^{-1}$ | Peak observed | Peak observed | Peak observed | Peak observed | Peak observed | No peak observed | Peak observed | No peak observed |
| | 1,740 to 1,800 cm$^{-1}$ | No peak observed | No peak observed | No peak observed | No peak observed | No peak observed | Peak observed | Peak observed | No peak observed |
| IR peak intensity | 1,640 to 1,700 cm$^{-1}$ | 0.561 | 0.239 | 0.406 | 0.476 | 0.389 | — | 0.044 | — |
| | 1,740 to 1,800 cm$^{-1}$ | — | — | — | — | — | 0.022 | 0.072 | — |

TABLE 2

| | | Examples | | | | | Comparative Examples | | |
|---|---|---|---|---|---|---|---|---|---|
| | | 6 | 7 | 8 | 9 | 10 | 4 | 5 | 6 |
| Cross-linkable fluoroelastomer | Ex. 1 | 100 | — | — | — | — | — | — | — |
| | Ex. 2 | — | 100 | — | — | — | — | — | — |
| | Ex. 3 | — | — | 100 | — | — | — | — | — |
| | Ex. 4 | — | — | — | 100 | — | — | — | — |
| | Ex. 5 | — | — | — | — | 100 | — | — | — |
| | Comp. Ex. 1 | — | — | — | — | — | 100 | — | — |
| | Comp. Ex. 2 | — | — | — | — | — | — | 100 | — |
| | Comp. Ex. 3 | — | — | — | — | — | — | — | 100 |
| MT carbon | | 30 | 30 | 30 | 30 | 30 | 30 | 30 | 30 |
| TAIC | | 5 | 5 | 5 | 5 | 5 | 5 | 5 | 5 |
| Perbutyl P | | 1 | 1 | 1 | 1 | 1 | 1 | 1 | 1 |
| Na stearate | | 1 | 1 | 1 | 1 | 1 | 1 | 1 | 1 |
| Primary cross-linking conditions | | 170° C. * 20 min | 170° C. * 20 min | 170° C. * 20 min | 170° C. * 20 min | 170° C. * 20 min | 170° C. * 20 min | 170° C. * 20 min | 170° C. * 20 min |
| Secondary cross-linking conditions | | 200° C. * 4 hours | 200° C. * 4 hours | 200° C. * 4 hours | 200° C. * 4 hours | 200° C. * 4 hours | 200° C. * 4 hours | 200° C. * 4 hours | 200° C. * 4 hours |
| MH | | 39 | 41 | 50 | 49 | 51 | — | 40 | — |
| ML | | 6 | 6 | 6 | 7 | 8 | — | 5 | — |
| MH – ML | | 34 | 35 | 44 | 42 | 43 | — | 35 | — |
| Tensile strength (MPa) | | 16 | 15 | 21 | 19 | 20 | — | 18 | — |
| Tensile elongation (%) | | 363 | 417 | 318 | 323 | 268 | — | 299 | — |
| Compression set (%) | | 43 | 43 | 26 | 31 | 28 | — | 35 | — |
| Mold-release force (g/50 mm) | | — | — | — | 173 | — | — | 237 | — |
| Mold-release properties | | ○ | ○ | ○ | ○ | ○ | — | X | — |

The entire disclosures of Japanese Patent Application No. 2006-147443 filed on May 26, 2006 and Japanese Patent Application No. 2006-241972 filed on Sep. 6, 2006 including specifications, claims, drawings and summaries are incorporated herein by reference in their entireties.

What is claimed is:

1. A cross-linkable fluoroelastomer having a Mooney viscosity of from 20 to 300, obtained by heat treating a mixture of a fluoroelastomer (A) and an organic peroxide (B) at a temperature of from 110 to 380° C. for from 10 seconds to 3 hours,
wherein the cross-linkable fluoroelastomer has an absorption peak at from 1,640 to 1,700 cm$^{-1}$, wherein the intensity of the absorption peak at from 1,640 to 1,700 cm$^{-1}$ of the infrared absorption spectrum as represented by absorbance of a hot pressed sample having a thickness of 0.2 mm is from 0.05 to 1.5, and
wherein after the heat treating the cross-linkable fluoroelastomer has more unsaturated carbon-carbon bonds than the fluoroelastomer (A),
wherein the fluoroelastomer (A) is a tetrafluoroethylene/propylene copolymer.

2. The cross-linkable fluoroelastomer according to claim 1, wherein the intensity of the absorption peak at from 1,640 to 1,700 cm$^{-1}$ of the infrared absorption spectrum as represented by absorbance of a hot pressed sample having a thickness of 0.2 mm is from 0.01 to 5.0.

3. The cross-linkable fluoroelastomer according to claim 1, of which the infrared absorption spectrum as represented by absorbance has no absorption peak at from 1,740 to 1,800 cm$^{-1}$ or has an absorption peak at from 1,740 to 1,800 cm$^{-1}$ with an absorption peak intensity of a hot pressed sample having a thickness of 0.2 mm of at most 2.0.

4. The cross-linkable fluoroelastomer according to claim 1, wherein the blend ratio of the organic peroxide (B) is from 0.1 to 10 parts by mass per 100 parts by mass of the fluoroelastomer (A).

5. The cross-linkable fluoroelastomer according to claim 1, wherein the temperature for half life of one minute of the organic peroxide (B) is from 110 to 300° C.

6. A fluoroelastomer composition comprising the cross-linkable fluoroelastomer as defined in claim 1, a cross-linking agent (C) and a cross-linking assistant (D).

7. A cross-linked rubber molded product obtained by cross-linking the fluoroelastomer composition as defined in claim 6.

8. The cross-linkable fluoroelastomer of claim 1, wherein the fluoroelastomer has one or more unsaturated carbon-carbon groups.

9. The cross-linkable fluoroelastomer according to claim 1, having no hydroxycarbonyl group.

10. The cross-linkable fluoroelastomer according to claim 1, which has a cross-linking density of from 34 to 44 when subjected to primary cross-linking conditions of 170° C. for 20 minutes and secondary cross-linking at 200° C. for 4 hours.

11. The cross-linkable fluoroelastomer according to claim 1, having a Mooney viscosity of from 20 to 105.

12. The cross-linkable fluoroelastomer of claim 1, wherein the organic peroxide is dicumyl peroxide, tertiary butyl cumyl peroxide, 1,3-bis(tert-butyl peroxy isopropyl) benzene or ditertiary butyl peroxide.

13. The cross-linkable fluoroelastomer according to claim 1, wherein the heat treating includes extruding the fluoroelastomer in the presence of the organic peroxide.

14. The cross-linkable fluoroelastomer according to claim 1, wherein the only halogen atoms in the fluoroelastomer (A) are F atoms.

15. The cross-linkable fluoroelastomer according to claim 1, wherein the fluoroelastomer (A) consists of polymerized monomer units of tetrafluoroethylene and propylene.

16. The cross-linkable fluoroelastomer according to claim 1, wherein the fluoroelastomer (A) consists of atoms of carbon, hydrogen and fluorine.

17. The cross-linkable fluoroelastomer according to claim 1, wherein the intensity of the absorption peak at from 1,640 to 1,700 cm$^{-1}$, of a hot pressed sample having a thickness of 0.2 mm, is from 0.239 to 2.0.

18. A cross-linked rubber molded product obtained by cross-linking the cross-linkable fluoroelastomer as defined in claim 1 by applying an ionizing radiation thereto.

19. A method for producing a cross-linkable fluoroelastomer, which comprises
heat-treating a mixture of a fluoroelastomer (A) and an organic peroxide (B) at a temperature of from 110 to 380° C. for from 10 seconds to 3 hours to form the cross-linkable fluoroelastomer,
wherein the cross-linkable fluoroelastomer formed by the heat-treating has an absorption peak at from 1,640 to 1,700 cm$^{-1}$, wherein the intensity of the absorption peak at from 1,640 to 1,700 cm$^{-1}$ of the infrared absorption spectrum as represented by absorbance of a hot pressed sample having a thickness of 0.2 mm is from 0.05 to 1.5, and
wherein after the heat treating the cross-linkable fluoroelastomer has more unsaturated carbon-carbon bonds than the fluoroelastomer (A),
wherein the fluoroelastomer (A) is a tetrafluoroethylene/propylene copolymer.

20. The method for producing a cross-linkable fluoroelastomer according to claim 19, wherein the fluoroelastomer (A) and the organic peroxide (B) are kneaded by means of an extruder.

21. The method for producing a cross-linkable fluoroelastomer according to claim 19, wherein the only halogen atoms in the fluoroelastomer (A) are F atoms.

22. The method according to claim 19, wherein the fluoroelastomer (A) consists of polymerized monomer units of tetrafluoroethylene and propylene.

23. The method according to claim 19, wherein the fluoroelastomer (A) consists of atoms of carbon, hydrogen and fluorine.

24. The method according to claim 19, wherein the intensity of the absorption peak at from 1,740 to 1,800 cm$^{-1}$ is from 0.239 to 2.0.

25. The method according to claim 19, further comprising:
isolating the cross-linkable fluoroelastomer after the heat treating.

26. A cross-linkable fluoroelastomer obtained by a heat-treatment of a mixture of a fluoroelastomer (A) which does not have an absorption peak at from 1,640 to 1,700 cm$^{-1}$ of the infrared absorption spectrum, and an organic peroxide (B) at a temperature of from 110 to 380° C. for from 10 seconds to 3 hours, wherein the cross-linkable fluoroelastomer has a Mooney viscosity of from 20 to 300, of which the absorption peak is at from 1,640 to 1,700 cm$^{-1}$ of the infrared absorption spectrum; the intensity of the absorption peak at from 1,640 to 1,700 cm$^{-1}$ of the infrared absorption spectrum as represented by absorbance of a hot pressed sample having a thickness of 0.2 mm is from 0.05 to 1.5; and the infrared absorption spectrum as represented by absorbance has no absorption peak at from 1,740 to 1,800 cm$^{-1}$ or has an absorption peak at from 1,740 to 1,800 cm$^{-1}$ with an absorption peak intensity of at most 0.2, and
wherein after the heat treating the cross-linkable fluoroelastomer has more unsaturated carbon-carbon bonds than the fluoroelastomer (A),
wherein the fluoroelastomer (A) is a tetrafluoroethylene/propylene copolymer.

27. The cross-linkable fluoroelastomer according to claim 26, wherein the blend ratio of the organic peroxide (B) is from 0.1 to 10 parts by mass per 100 parts by mass of the fluoroelastomer (A).

28. The cross-linkable fluoroelastomer according to claim 26, wherein the temperature for half life of one minute of the organic peroxide (B) is from 110 to 300° C.

29. A cross-linked rubber molded product obtainable by cross-linking the cross-linkable fluoroelastomer as defined in claim 26, by applying an ionizing radiation thereto.

30. The cross-linkable fluoroelastomer according to claim 26, wherein the only halogen atoms in the fluoroelastomer (A) are F atoms.

31. The cross-linkable fluoroelastomer according to claim 26, wherein the fluoroelastomer (A) consists of polymerized monomer units of tetrafluoroethylene and propylene.

32. The cross-linkable fluoroelastomer according to claim 26, wherein the fluoroelastomer (A) consists of atoms of carbon, hydrogen and fluorine.

33. The cross-linkable fluoroelastomer according to claim 26, wherein the intensity of the absorption peak at from 1,640 to 1,700 cm$^{-1}$ is from 0.239 to 1.5.

34. A process for producing a cross-linkable fluoroelastomer comprising a heat-treatment of a mixture of a fluoroelastomer (A) which does not have an absorption peak at from 1,640 to 1,700 cm$^{-1}$ of the infrared absorption spectrum, and an organic peroxide (B) at a temperature of from 110 to 380° C. for from 10 seconds to 3 hours,
wherein the cross-linkable fluoroelastomer has a Mooney viscosity of from 20 to 300, of which the absorption peak is at from 1,640 to 1,700 cm$^{-1}$ of the infrared absorption spectrum; the intensity of the absorption peak at from 1,640 to 1,700 cm$^{-1}$ of the infrared absorption spectrum as represented by absorbance of a hot pressed sample having a thickness of 0.2 mm is from 0.05 to 1.5; and the infrared absorption spectrum as represented by absorbance has no absorption peak at from 1,740 to 1,800 cm$^{-1}$ or has an absorption peak, at from 1,740 to 1,800 cm$^{-1}$ with an absorption peak intensity of at most 0.2, and
wherein after the heat treating the cross-linkable fluoroelastomer has more unsaturated carbon-carbon bonds than the fluoroelastomer (A),
wherein the fluoroelastomer (A) is a tetrafluoroethylene/propylene copolymer.

35. The process for producing a cross-linkable fluoroelastomer according to claim 34, wherein the heat-treatment is carried out by kneading a mixture of the fluoroelastomer (A) and the organic peroxide (B) by means of an extruder.

36. A fluoroelastomer composition comprising the cross-linkable fluoroelastomer produced by the process as defined in claim 34, a cross-linking agent (C) and a cross-linking assistant (D).

37. A cross-linked rubber molded product obtainable by cross-linking the fluoroelastomer composition as defined in claim 36.

38. The process for producing a cross-linkable fluoroelastomer according to claim 34, wherein the only halogen atoms in the fluoroelastomer (A) are F atoms.

39. The process for producing a cross-linkable fluoroelastomer according to claim 34, wherein the fluoroelastomer (A) consists of polymerized monomer units of a perfluoro olefin and a hydrocarbon.

40. The process for producing a cross-linkable fluoroelastomer according to claim 34, wherein the fluoroelastomer (A) consists of atoms of carbon, hydrogen and fluorine.

41. The process according to claim 34, wherein the intensity of the absorption peak at from 1,640 to 1,700 cm$^{-1}$ is from 0.239 to 1.5.

42. The process according to claim 34, further comprising:
isolating the cross-linkable fluoroelastomer after the heat treating.

* * * * *